United States Patent
Ando et al.

(10) Patent No.: US 9,878,402 B2
(45) Date of Patent: Jan. 30, 2018

(54) HIGH-STRENGTH ALUMINUM ALLOY BRAZING SHEET AND METHOD OF MANUFACTURE

(71) Applicants: Makoto Ando, Tokyo (JP); Akio Niikura, Tokyo (JP); Yoichiro Bekki, Tokyo (JP)

(72) Inventors: Makoto Ando, Tokyo (JP); Akio Niikura, Tokyo (JP); Yoichiro Bekki, Tokyo (JP)

(73) Assignee: UACJ Corporation, Tokyo (JP)

( * ) Notice: Subject to any disclaimer, the term of this patent is extended or adjusted under 35 U.S.C. 154(b) by 588 days.

(21) Appl. No.: 14/528,930

(22) Filed: Oct. 30, 2014

(65) Prior Publication Data

US 2015/0144229 A1   May 28, 2015

Related U.S. Application Data

(62) Division of application No. 13/200,241, filed on Sep. 20, 2011, now abandoned.

(30) Foreign Application Priority Data

Sep. 21, 2010  (JP) .................................. 2010-211434
Apr. 25, 2011  (JP) .................................. 2011-96786

(51) Int. Cl.
| | | |
|---|---|---|
| B23K 35/00 | (2006.01) | |
| B23K 1/00 | (2006.01) | |
| B23K 1/20 | (2006.01) | |
| B23K 35/02 | (2006.01) | |
| B23K 35/28 | (2006.01) | |
| B32B 15/01 | (2006.01) | |
| C22C 21/00 | (2006.01) | |
| C22C 21/02 | (2006.01) | |
| C22C 21/10 | (2006.01) | |
| C22C 21/12 | (2006.01) | |
| C22C 21/14 | (2006.01) | |
| C22F 1/00 | (2006.01) | |
| C22F 1/04 | (2006.01) | |
| C22F 1/043 | (2006.01) | |
| C09K 5/14 | (2006.01) | |
| B23K 101/00 | (2006.01) | |
| B23K 101/14 | (2006.01) | |
| F28F 21/08 | (2006.01) | |

(52) U.S. Cl.
CPC .......... B23K 35/002 (2013.01); B23K 1/0012 (2013.01); B23K 1/203 (2013.01); B23K 35/0238 (2013.01); B23K 35/286 (2013.01); B32B 15/016 (2013.01); C09K 5/14 (2013.01); C22C 21/00 (2013.01); C22C 21/02 (2013.01); C22C 21/10 (2013.01); C22C 21/12 (2013.01); C22C 21/14 (2013.01); C22F 1/00 (2013.01); C22F 1/04 (2013.01); C22F 1/043 (2013.01); B23K 2201/006 (2013.01); B23K 2201/14 (2013.01); F28F 21/084 (2013.01); F28F 21/089 (2013.01); Y10T 428/12764 (2015.01)

(58) Field of Classification Search
CPC .......... C22F 1/04; C22F 1/043; B23K 35/002; B23K 35/286; C22C 21/02
See application file for complete search history.

(56) References Cited

U.S. PATENT DOCUMENTS

| | | |
|---|---|---|
| 8,343,630 B2 | 1/2013 | Katsushi |
| 2009/0020585 A1 | 1/2009 | Fukumoto |
| 2009/0162686 A1 | 6/2009 | Matsukado |
| 2011/0014494 A1 | 1/2011 | Matsumoto |
| 2011/0287276 A1 | 11/2011 | Izumi |

FOREIGN PATENT DOCUMENTS

| | | |
|---|---|---|
| EP | 1 795 294 | 6/2007 |
| EP | 2 017 032 | 1/2009 |
| JP | 02 282451 | 11/1990 |
| JP | 1996246117 | 9/1996 |
| JP | 1997184038 | 7/1997 |
| JP | 2008231555 | 2/2008 |
| WO | WO 2009/101896 | 8/2009 |
| WO | WO2009101896 | 8/2009 |

OTHER PUBLICATIONS

EPO Search Report Published May 11, 2014.
JP 1996246117 (Translation).
WO2009101896A1 Abstract translation only.
JP 2008231555 (Translation).
JP 1997184038 (Translation).

*Primary Examiner* — Jessee Roe
(74) *Attorney, Agent, or Firm* — Law Offices of John A. Parrish

(57) ABSTRACT

An aluminum alloy brazing sheet having a core material of an aluminum alloy, and a filler material cladded on the core is disclosed. The core material is an aluminum alloy having about 0.05 to about 1.2 mass Si, about 0.05-about 1.0 mass % Fe, about 0.05-about 1.2 mass % Cu, and about 0.6-about 1.8 mass % Mn, balance Al and the inevitable impurities. The filler material includes an aluminum alloy having about 2.5-about 13.0 mass % Si. Also, there is provided a method of manufacturing such an aluminum alloy brazing sheet.

10 Claims, No Drawings

US 9,878,402 B2

HIGH-STRENGTH ALUMINUM ALLOY BRAZING SHEET AND METHOD OF MANUFACTURE

CROSS-REFERENCE TO RELATED APPLICATION

This application is a divisional of application Ser. No. 13/200,241, now abandoned, filed Sep. 20, 2011. The present application claims priority to Japanese Application 2010-211434 filed Sep. 21, 2010 and to Japanese Application 2011-96786 filed Apr. 25, 2011, the content of which are incorporated by reference in their entirety herein.

FIELD OF THE INVENTION

The present invention relates to an aluminum alloy brazing sheet used in a heat exchanger for an automobile. More specifically, the present invention relates to a high strength aluminum alloy brazing sheet which is suitably utilized as a passage-forming member for a compressed air having a high temperature air or a cooling medium, and a method of manufacturing such a brazing sheet.

BACKGROUND OF THE INVENTION

Since an aluminum alloy exhibits a lightweight nature and a high thermal conductivity, and since a high corrosion-resistant feature can be realized in the aluminum alloy by a suitable processing, it is utilized in a heat exchanger for an automobile, for example, a radiator, a condenser, an evaporator, a heater, an intercooler and so forth. For a tube member for the automobile heat exchanger, a 2-ply clad material or a 3-ply clad material is used: the 2-ply clad material includes a core material composed of an Al/Mn-based alloy such as JIS3003 alloy and so forth, and an Al/Si-based filler material or an Al/Zn-based sacrificial anode material cladded on one surface of the core material; and the 3-ply clad material includes a core material composed of an Al/Mn-based alloy such as JIS3003 alloy and so forth, an Al—Si-based filler material or an Al/Zn-based sacrificial anode material cladded on one surface of the core material, and an Al/Si-based filler material cladded on the other surface of the core material.

Usually, in a heat exchanger, one of these clad materials is combined with and joined to a corrugated fin by carrying out a brazing process at a high temperature on the order of 600 C, to thereby produce a tube member. After the tube members so produced are installed as a heat exchanger in an automobile, when any one of the tube members is broken and pierced, the tube member concerned leaks a cooling water or a cooling medium circulating in an interior of the heat exchanger. Thus, in order that a service life of the heat exchanger can be prolonged, there is a need of an aluminum alloy brazing sheet exhibiting a superior strength after being subjected to a brazing process.

Incidentally, in recent years, there is much demand of lighter weight for an automobile, and thus a heat exchanger for the automobile must become lighter to comply with the demand. To this end, it has been considered and studied that members for producing the heat exchanger are made thin, and thus it is necessary to further improve a strength of the aluminum alloy brazing sheet after being subjected to the brazing process.

Conventionally, in general, for a tube member for producing a heat exchanger, such as a radiator or a heater for automobiles, in which a coolant is circulated, a 3-ply tube member has been used, with the 3-ply tube member including a core material composed of an Al/Mn-based alloy or the like, which is represented by JIS 3003, an inner surface of the core material being cladded with a sacrifice material such as Al/Zn-based alloy or the like, an atmosphere-side surface or outer surface of the core material being cladded with a filler material such as Al/Si-based alloy or the like. Nevertheless, a strength of the clad material, in which the core material composed of JIS 3003 alloy is used, is on the order of 110 MPa after it is subjected to a brazing process, and this strength is insufficient.

In general, it is considered that the core material composed of the Al/Mn-based alloy, which covers a major part of the strength of the brazing sheet, is a dispersion strengthened alloy. For this reason, in the prior art, it has been proposed that the core material is strengthened by making the density of particles of intermetallic compounds in the core material high, and making the particles of intermetallic compounds in the core material small. Nevertheless, since the brazing sheet is heated to a temperature of 600 C, a major part of the fine intermetallic compounds is again subjected to a solid solution. Thus, in order to improve the strength of the core material, it is significant to reduce the coarse intermetallic compounds which are not again subjected to the solid solution during the brazing process, resulting in a large contribution to a solid solution strengthening effect. Since the coarse intermetallic compounds are mainly produced during various processes between a casting process and a hot rolling process, it is necessary to minutely control the conditions of these processes.

For example, in Patent Document 1, it is disclosed that a core material is subjected to a homogenization process at a temperature of at least 570° C. over a time period of at least 8 hrs, that the core material is then subjected to a hot rolling process at a temperature within a range of 450-550° C., and that various conditions of other processes are minutely regulated. As a result, a metal texture so obtained features that a density of precipitates having a size of at least 1 μm is at least 10,000/mm². Nevertheless, no reference is made to the fact that the intermetallic compounds are again subjected to the solid solution during the brazing process.

PATENT DOCUMENTS

Patent Document 1: JP-H02-282451 A

A feature of the present invention is the providing of an aluminum alloy brazing sheet not only has a superior brazing property and a superior corrosion resistance, but also features a large strength. Especially, the present invention aims at providing an aluminum alloy brazing sheet, which can be suitably utilized as a passage-forming member for an automobile heat exchanger, and a method of manufacturing the aluminum alloy brazing sheet.

SUMMARY OF THE INVENTION

It has been found that a clad material featuring a specific metal texture, which is produced by specific processes, using an aluminum alloy core material having a specific alloy composition, is suitable for the present invention using aluminum alloy, resulting in achievement of the present invention.

In a first aspect, the present invention relates to a high strength aluminum alloy brazing sheet having a core material composed of an aluminum alloy; and a filler material cladded on at least one surface of the core material and composed of an Al/Si-based alloy. The core material is an aluminum alloy which contains Si within a range of about 0.05-about 1.2 mass %, Fe within the range of about 0.05-about 1.0 mass %, Cu within the range of about 0.05-about 1.2 mass %, and Mn within the range of about 0.6-about 1.8 mass %, and where the balance is Al and the inevitable impurities; that the filler material is an aluminum alloy which contains Si within a range of about 2.5-about 13.0 mass %, and Fe falling within a range of about 0.05-about 1.0 mass %, and where the balance is Al and the inevitable impurities; and that the area percentage, at which an arbitrary cross-section of the core material before a brazing process is occupied with intermetallic compounds having a size falling within a range of about 0.2-about 0.5 µm, is at most 5%; and that a solid solution amount of Mn is at least 0.2 mass % in the core material after the brazing process.

In a second aspect, the present invention relates to a core material that further contains at least one element selected from the group of Mg falling within a range of about 0.05-about 0.5 mass %, Ti falling within a range of about 0.05-about 0.3 mass %, Zr falling within a range of about 0.05-about 0.3 mass %, Cr falling within a range of about 0.05-about 0.3 mass %, and V falling within a range of about 0.05-about 0.3 mass %, in addition to the aforesaid elements.

In a third aspect, the present invention relates to a filler material cladded to the aforesaid one surface of the core material further contains Zn falling within a range of 0.3-5.5 mass %, in addition to the aforesaid elements.

In a fourth aspect, the present invention relates to a high strength aluminum alloy brazing sheet that includes a core material composed of an aluminum alloy; a filler material cladded on a surface of the core material and composed of an Al/Si-based alloy; and a sacrificial anode material cladded on another surface of the core material and composed of an aluminum alloy where the core material is an aluminum alloy which contains Si falling within a range of about 0.05-about 1.2 mass %, Fe falling a range of about 0.05-about 1.0 mass %, Cu falling within a range of about 0.05-about 1.2 mass %, and Mn falling within a range of about 0.6-about 1.8 mass %, and where the balance is Al and the inevitable impurities; that the filler material is an aluminum alloy that contains Si falling within a range of 2.5-13.0 mass %, and Fe falling within a range of 0.05-1.0 mass %, and where the balance is Al and the inevitable impurities; that the sacrificial anode material is an aluminum alloy which contains Zn falling within a range of about 0.5-about 6.0 mass %, Si falling within a range of about 0.05-about 1.5 mass %, and Fe falling within a range of about 0.05-about 2.0 mass %, and where the balance is Al and the inevitable impurities; that an area percentage, at which an arbitrary cross-section of the core material before a brazing process is occupied with intermetallic compounds having a size falling within a range of about 0.2-about 0.5 µm, is at most 5%; and that a solid solution amount of Mn is at least 0.2 mass % in the core material after the brazing process.

In a fifth aspect, the present invention relates to a core material that further contains at least one element selected from the group of Mg falling within a range of about 0.05-about 0.5 mass %, Ti falling within a range of about 0.05-about 0.3 mass %, Zr falling within a range of about 0.05-about 0.3 mass %, Cr falling within a range of about 0.05-about 0.3 mass %, and V falling within a range of about 0.05-about 0.3 mass %, in addition to the aforesaid elements.

In sixth aspect, the present invention relates to a filler material further contains Zn falling within a range of about 0.3-about 5.5 mass %, in addition to the aforesaid elements.

In a seventh aspect, the present invention relates to a sacrificial anode material that further contains at least one element selected from the group Mn falling within a range of about 0.05-about 1.8 mass %, Mg falling within a range of about 0.5-about 3.0 mass %, Ti falling within a range of about 0.05-about 0.3 mass %, Zr falling within a range of about 0.05-about 0.3 mass %, Cr falling within a range of about 0.05-about 0.3 mass %, and V falling within a range of about 0.05-about 0.3 mass %, in addition to the aforesaid elements.

In an eighth aspect, the present invention relates to a method of manufacturing a high strength aluminum alloy brazing sheet as set forth in any one of aspects 1 to 3. The method entails casting processes for casting the aluminum alloys of the core material and the filler material, respectively; a combining process in which the cast core material is combined with the cast filler material so that the cast filler material is applied to at least one surface of the cast core material, to thereby produce a composite material; a heating process in which the composite material is heated and held after the combining process; and a hot clad rolling process in which the composite material is rolled after the heating process where the casting speed V (mm/min) and an amount of cooling water W (kg/min×cm) satisfy the following formula (1) in the casting process for the core material:

$$25 \leq 0.4 \times V + W \tag{1};$$

that the composite material is held at a temperature falling within a range of about 400-about 500° C. over a time period falling within a range of 0-about 10 hrs during the heating process; that a time period, which is counted from a rolling start, and which is taken to reduce a thickness of the composite material by 50 mm, is at most 5 min in the hot clad rolling process; that a temperature of the composite material falls within a range of about 400-about 450° C. at the time when the thickness of the composite material is reduced by 50 mm; that a time period, which is counted from the time when the thickness of the composite material is reduced by 50 mm, and which is taken to reduce the thickness of the composite material to 20 mm, is at most 10 min; that a temperature of the composite material falls within a range of about 300-about 400° C. at the time when the thickness of the composite material is reduced to 10 mm; and that a time period, which is counted from the rolling start to a rolling end, is at most 40 min.

In a ninth aspect, the present invention relates to a method of manufacturing a high strength aluminum alloy brazing sheet as set forth in any one of aspects 4 to 7 above entailing: casting processes for casting the aluminum alloys of the core material, the filler material and the sacrificial anode material, respectively; a combining process in which the cast core material is combined with the cast filler material and the cast sacrificial anode material so that the cast filler material is applied to at least one surface of the cast core material, and so that the cast sacrificial anode material to another surface of the cast core material, to thereby produce a composite material; a heating process in which the composite material is heated and held after the combining process; and a hot clad rolling process in which the composite material is rolled after the heating process where a casting speed V (mm/min) and an amount of cooling water W (kg/min×cm) satisfy the following formula (1) in the casting process for the core material:

$$25 \leq 0.4 \times V + W \tag{1};$$

that the composite material is held at a temperature falling within a range of about 400-about 500° C. over a time period falling within a range of 0-about 10 hrs during the heating process; that a time period, which is counted from a rolling start, and which is taken to reduce a thickness of the composite material by 50 mm, is at most 5 min in the hot clad rolling process; that a temperature of the composite material falls within a range of about 400-about 450° C. at the time when the thickness of the composite material is reduced by 50 mm; that a time period, which is counted from the time when the thickness of the composite material is reduced by 50 mm, and which is taken to reduce the thickness of the composite material to 20 mm, is at most 10 min; that a temperature of the composite material falls within a range of about 300-about 400° C. at the time when the thickness of the composite material is reduced to 10 mm; and that a time period, which is counted from the rolling start to a rolling end, is at most 40 min.

Effects of the Invention

According to the present invention, there is provided a high strength aluminum alloy brazing sheet exhibiting a high strength after a brazing process, and a method of manufacturing such a brazing sheet. Also, not only can this brazing sheet have superior brazing properties such as a fin joining rate, an erosion resistance and so forth, but also it is possible to attain a superior corrosion resistance, using a filler material composed of suitable components or a sacrificial anode material composed of suitable components, or using a filler material of composed of suitable components and a sacrificial anode material composed of suitable components. Especially, the aluminum alloy brazing sheet according to the present invention can be suitably utilized as a tube member in a heat exchanger for an automobile due to not only the aforesaid features but also a lightweight nature and a high thermal conductivity thereof.

DETAILED DESCRIPTION OF THE INVENTION

Next, an aluminum alloy brazing sheet according to the present invention and a method of manufacturing such a brazing sheet will now be explained in detail. Note that performance on a strength and a corrosion resistance is referred to as being obtained after a brazing process. Usually, the brazing process is carried out in such a manner that the brazing sheet is heated to a temperature on the order of about 600° C., and is then air-cooled, and thus a heating process, a heating rate, a cooling rate, a heating time, a cooling time and so forth are not especially limited.

First, components of each of core, brazing and sacrificial anode materials for producing the aluminum alloy brazing sheet according to the present invention, a reason why the components should be contained in each of the materials, and a range on the content of each of the components will be explained below.

A: Components of Alloys
1) Core Material

Si produces Al/Mn/Si-based intermetallic compounds together with Mn, and improves strength of the core material by either a dispersion hardening effect or a solid solution strengthening effect obtained due to a solid solution of Si in the matrix phase of aluminum. The content of Si falls within a range of about 0.05-about 1.2 mass % (which is merely abbreviated to % hereinafter). When the Si content is less than about 0.05%, the aforesaid effect is small. When the Si content exceeds about 1.2%, a melting point of the core material declines, and thus an erosion of the core material by the filler material occurs. Preferably, the Si content falls within a range of about 0.3-about 1.0%.

Fe easily produces intermetallic compounds having a size which can serve as nucleuses for recrystallization, and makes a crystallized grain diameter large after a brazing process. In order to restrain diffusion of a filler material, the content of Fe falls within a range of about 0.05-about 1.0%. When the Fe content is less than about 0.05%, it is necessary to use a high-purity aluminum metal, resulting in an increase in a manufacturing cost. When the Fe content exceeds about 1.0%, the crystallized grain diameter becomes fine after a brazing process, and thus the diffusion of the filler material is caused. Preferably, the Fe content falls within a range of about 0.1-about 0.5%.

Cu improves a strength of the core material by a solid solution strengthening effect. The content of Cu falls within a range of about 0.05-about 1.2%. When the Cu content is less than about 0.05%, the aforesaid effect becomes small. When the Cu content exceeds about 1.2%, a crack occurs in the aluminum alloy during a casting process. Preferably, the Cu content falls within a range about 0.3-about 1.0%.

Mn produces Al/Mn/Si-based intermetallic compounds together with Si, and improves strength of the core material by either a dispersion hardening effect or a solid solution strengthening effect obtained due to a solid solution of Mn in the matrix phase of aluminum. The content of Mn falls within a range of about 0.6-about 1.8%. When the Mn content is less than about 0.6%, the aforesaid effect becomes small. When the Mn content exceeds about 1.8%, large intermetallic compounds are easily produced during a casting process so that a plastic-workability deteriorates. Preferably, the Mn content falls within a range of about 0.8-about 1.6%.

Mg improves a strength of the core material by separation of $Mg_2Si$, and thus it is preferable that the core material contains Mg. Preferably, a content of Mg falls within a range of about 0.05-about 0.5%. When the Mg content is less than about 0.05%, there may be a case where the aforesaid effect becomes small. When the Mg content exceeds about 0.5%, there may be a case where it is difficult to carry out a brazing process. More preferably, the Mg content falls within a range of about 0.15-about 0.4%.

Ti improves a strength of the core material by a solid solution strengthening effect, and thus it is preferable that the core material contains Ti. Preferably, the content of Ti falls within a range of about 0.05-about 0.3%. When the Ti content is less than about 0.05%, there may be a case where the aforesaid effect is not obtained. When the Ti content exceeds about 0.3%, large intermetallic compounds are easily produced so that there may be a case where a plastic-workability deteriorates. More preferably, the Ti content falls within a range of about 0.1-about 0.2%.

Zr not only improves a strength of the core material by a solid solution strengthening effect, but also separates Al/Zr-based compounds, resulting in enlargement of crystallized grains after a brazing process, and thus it is preferable that the core material contains Zr. Preferably, the content of Zr falls within the range of about 0.05-about 0.3%. When the Zr content is less than about 0.05%, there may be a case where the aforesaid effect is not obtained. When the Zr content exceeds about 0.3%, large intermetallic compounds are easily produced so that there may be a case where a plastic-workability deteriorates. More preferably, the Zr content falls within a range of about 0.1-about 0.2%.

Cr not only improves a strength of the core material by a solid solution strengthening effect, but also separates Al/Cr-based compounds, resulting in enlargement of crystallized grains after a brazing process, and thus it is preferable that the core material contains Cr. Preferably, the content of Cr falls within the range of about 0.05-about 0.3%. When the Cr content is less than about 0.05%, there may be a case where the aforesaid effect is not obtained. When the Cr content exceeds about 0.3%, large intermetallic compounds are easily produced so that there may be a case where a plastic-workability deteriorates. More preferably, the Cr content falls within a range of about 0.1-about 0.2%.

V improves strength of the core material by a solid solution strengthening effect, and thus it is preferable that the core material contains V. Preferably, the content of V falls within the range of about 0.05-about 0.3%. When the V content is less than about 0.05%, there may be a case where the aforesaid effect is not obtained. When the V content exceeds about 0.3%, large intermetallic compounds are easily produced so that there may be a case where a plastic-workability deteriorates. More preferably, the V content falls within a range of about 0.1-about 0.2%.

If necessary, at least one of the elements Mg, Ti, Zr, Cr and V may be contained in the core material. Also, each of these elements may contain the inevitable impurities of at most 0.05%, and a total content of the inevitable impurities may be at most 0.15%.

2) Filler Material

Si causes a fall of a melting point of the filler material so that the filler material may take on a liquid phase, to thereby make a brazing process possible. The content of Si falls within a range of about 2.5-about 13.0%. When the Si content is less than about 2.5%, an amount of the liquid phase becomes small so that a brazing function cannot be sufficiently obtained. On the other hand, when the Si content exceeds about 13.0%, an amount of Si which is diffused into a counter-material such as a fin material and so forth is excessive, to thereby cause a melting of the counter-material. It is preferable that the Si content falls within a range of about 3.5-about 12.0%, more preferably, about 7.0-about 12.0%.

Fe easily produces Al/Fe-based compounds and Al/Fe/Si-based compounds. Due to the production of the Al/Fe/Si-based compounds, an effective Si amount of the filler material declines. Also, due to the production of the Al/Fe-based compounds and Al/Fe/Si-based compounds, fluidity of the filler material declines during a brazing process, resulting in deterioration in a brazing property. The content of Fe falls within a range of about 0.05-about 1.0%. When the Fe content exceeds about 1.0%, a brazing property deteriorates so that sufficient brazing cannot be obtained. On the other hand, when the Fe content is less than about 0.05%, it is necessary to use a high-purity aluminum metal, resulting in an increase in a manufacturing cost. Preferably, the Fe content falls within a range of about 0.1-about 0.8%.

Zn can give a lower potential to the filler material to thereby establish a potential difference between the filler material and the core material whereby it is possible to improve a corrosion resistance due to a sacrificial anode effect, and thus it is preferable that the filler material contains Zn. The content of Zn falls within a range of about 0.3-about 5.5%. When the Zn content is less than about 0.3%, there may be a case where the aforesaid effect is not sufficiently obtained. When the Zn content exceeds about 5.5%, Zn is concentrated in a joining area on a counter-material such as a fin material and so forth, and the concentrated joining area is subjected to a prior corrosion so that the counter-material may be peeled. More preferably, the Zn content falls within the range of about 0.5-about 3.0%.

Each of these elements may contain the inevitable impurities in an amount of at most 0.05%, and that a total content of the inevitable impurities may be at most 0.15%. Also, the filler material may be cladded on at least one surface of the core material.

3) Sacrificial Anode Material

Zn can give a lower potential to the sacrificial anode material to thereby establish a potential difference between the sacrificial anode material and the core material whereby it is possible to improve a corrosion resistance by a sacrificial anode effect. The content of Zn falls within a range of about 0.5-about 6.0%. When the Zn content is less than about 0.5%, the aforesaid effect cannot be sufficiently obtained. When the Zn content exceeds about 6.0%, a corrosion rate is accelerated so that the sacrificial anode material prematurely disappears, resulting in deterioration in a corrosion resistance. Preferably, the Zn content falls within the range of about 1.0-about 5.0%.

Si produces Al/Fe/Mn/Si-based compounds together with Fe and Mn, and improves a strength of the sacrificial anode material by either a dispersion hardening effect or a solid solution strengthening effect obtained due to a solid solution of Si in the matrix phase of aluminum. Also, Si reacts with Mg diffused from the core material, to thereby produce $Mg^2Si$ compounds so that the sacrificial anode material is strengthened. The content of Si falls within a range of about 0.05-about 1.5%. When the Si content is less than about 0.05%, it is necessary to use a high-purity aluminum metal, resulting in an increase in a manufacturing cost. On the other hand, when the Si content exceeds about 1.5%, a melting point of the sacrificial anode material declines, resulting in a melting of the sacrificial and material, and an upper potential is given to the sacrificial anode material so that a sacrificial anode effect is suppressed, resulting in deterioration in a corrosion resistance. Preferably, the Si content falls within a range of about 0.05-about 1.2%.

Fe produces Al/Fe/Mn/Si-based compounds together with Si and Mn, and improves strength of the sacrificial anode material by a dispersion hardening effect. The content of Fe falls within a range of about 0.05-about 2.0%. When the Fe content is less than about 0.05%, it is necessary to use a high-purity aluminum metal, resulting in an increase in a manufacturing cost. On the other hand, when the Fe content exceeds about 2.0%, large intermetallic compounds are easily produced during a casting process so that a plastic-workability deteriorates. Preferably, the Fe content falls within a range of about 0.05-about 1.5%.

Mn improves strength and a corrosion resistance of the sacrificial anode material, and thus it is preferable that the sacrificial anode material contains Mn. Preferably, the content of Mn falls within a range of about 0.05-about 1.8%. When the Mn content exceeds about 1.8%, there may be a case where large intermetallic compounds are easily produced during a casting process so that a plastic-workability deteriorates, and where an upper potential is given to the sacrificial anode material so that a sacrificial anode effect is suppressed, resulting in deterioration in a corrosion resistance. On the other hand, when the Mn content is less than about 0.05%, there may be a case where the aforesaid effect is not sufficiently obtained. More preferably, the Mn content falls within a range of about 0.05-about 1.5%.

Mg improves strength of the sacrificial anode material due to separation of $Mg_2SiMg$. Also, not only the strength of the sacrificial anode material per se is improved, but also a strength of the core material is improved due to the fact that Mg is diffused into the core material during a heating process for brazing. For these reasons, it is preferable that the sacrificial anode material contains Mg. Preferably, the content of Mg falls within a range of about 0.5-about 3.0%. When the Mg content is less than about 0.5%, there may be a case where the aforesaid effect becomes small. When the Mg content exceeds about 3.0%, there may be case where it is difficult to carry out a pressure-joining during a hot clad rolling process. Preferably, the Mg content falls within the range of about 0.5-about 2.0%. Note, due to the fact that Mg retards a brazing property in a Nocolok brazing method, when the sacrificial anode material contains Mg in an amount of at most 0.5%, it is impossible to carry out the Nocolok brazing method. Thus, in this case, in order to join tube members to each other, it is necessary to utilize, for example, a welding method.

Ti improves not only strength of the sacrificial anode material by a solid solution strengthening effect, but also corrosion resistance, and thus it is preferable that the sacrificial anode material contains Ti. Preferably, the content of Ti falls within a range of about 0.05-about 0.3%. When the Ti content is less than about 0.05%, there may be a case where the aforesaid effect is not obtained. On the other hand, when the Ti content exceeds about 0.3%, large intermetallic compounds are easily produced so that there may be a case where a plastic-workability deteriorates. Preferably, the Ti content falls within a range of about 0.05-about 0.2%.

Zr not only improves a strength of the sacrificial anode material by a solid solution strengthening effect, but also separates Al/Zr-based compounds, resulting in enlargement of crystallized grains after brazing, and thus it is preferable that the sacrificial anode material contains Zr. Preferably, the content of Zr falls within a range of about 0.05-about 0.3%. When the Zr content is less than about 0.05%, there may be a case where the aforesaid effect is not obtained. When the Zr content exceeds about 0.3%, large intermetallic compounds are easily produced so that there may be a case where a plastic-workability deteriorates. More preferably, the Zr content falls within the range of about 0.1-about 0.2%.

Cr not only improves a strength of the sacrificial anode material by a solid solution strengthening effect, but also separates Al/Cr-based compounds, resulting in enlargement of crystallized grains after brazing, and thus it is preferable that the sacrificial anode material contains Cr. Preferably, the content of Cr falls within a range of about 0.05-about 0.3%. When the Cr content is less than about 0.05%, there may be a case where the aforesaid effect is not obtained. When the Cr content exceeds about 0.3%, large intermetallic compounds are easily produced so that there may be a case where a plastic-workability deteriorates. More preferably, the Cr content falls within the range of about 0.1-about 0.2%.

V improves not only a strength of the sacrificial anode material by a solid solution strengthening effect, but also corrosion resistance, and thus it is preferable that the sacrificial anode material contains V. Preferably, the content of V falls within a range of about 0.05-about 0.3%. When the V content is less than about 0.05%, there may be a case where the aforesaid effect is not obtained. On the other hand, when the V content exceeds about 0.3%, large intermetallic compounds are easily produced so that there may be a case where a plastic-workability deteriorates. Preferably, the V content falls within the range of about 0.05-about 0.2%.

At least one of the elements Mn, Mg, Ti, Zr, Cr and V may be added to the sacrificial anode material, if necessary. Note that each of these elements may contain the inevitable impurities in an amount of at most 0.05%, and the total content of the inevitable impurities may be at most 0.15%.

Also, for example, when a high corrosion resistance is demanded in an environment in which a heat exchanger is used, the sacrificial anode material is cladded on one surface of the core material.

B: Metal Texture

Also, the aluminum alloy brazing sheet according to the present invention participates in a metal texture of the core material. In this metal texture, an area percentage, at which an arbitrary cross-section of the core material before a brazing process is occupied with intermetallic compounds having a size falling within a range of 0.2-0.5 μm, is at most 5%, and a solid solution amount of Mn is limited to at least 0.2% in the core material after the brazing process. The ground for this limitation will be explained below. Note, the size of the intermetallic compounds is defined as a projected area diameter.

As already stated, in order to increase a strength of the brazing sheet after a brazing process, it is effective that a solid solution amount of Mn becomes large in the core material after a brazing process. When the solid solution amount of Mn is at least 0.2% after the brazing process, a solid solution strengthening effect can be sufficiently obtained. When the solid solution amount of Mn is less than 0.2% after the brazing process, the solid solution strengthening effect becomes small. Note, although there is no upper limit of the solid solution amount of Mn in view of a high strengthening of the core material, it is difficult to obtain the solid solution amount of Mn having more than 0.8% in the components of the core material according to the present invention. Also, note that the measurement of the solid solution amount of Mn after the brazing process is carried out by: removing a cladding from the core material with a caustic etching process; resolving the core material in a phenol solution; filtering the un-resolvable intermetallic compounds out of the solution; and by subjecting the intermetallic compounds to a measuring process using an optical emission spectrometer.

Also, due to the fact that Mn is included in the intermetallic compounds, in order that the solid solution amount of Mn is at least 0.2% after a brazing process, the intermetallic compounds having a relative large size should become as small as possible in a blank state of the core material before the brazing process. In this view point, it has been found by the inventors that it is possible to obtain the Mn solid solution amount of at least 0.2% after the brazing process to thereby attain a sufficient solid solution strengthening effect when the area percentage of the intermetallic compound having the size falling within the range of about 0.2-about 0.5 μm included in the core material in a blank of the brazing sheet before the brazing process is at most 5% in the arbitrary cross-section of the core material before the brazing process. When the area percentage of the intermetallic compound having the size falling within the range of 0.2-0.5 μm exceeds 5%, the Mn solid solution amount becomes less than 0.2% after the brazing process, it is extremely difficult to obtain a sufficient solid solution strengthening effect. Since the intermetallic compounds having a size of less than 0.2 μm is again subjected to a solid solution during the brazing process so that the solid solution strengthening effect cannot be retarded after the brazing process. Also, the intermetallic compounds having a size of more than 0.5 μm are ordinarily Al/Fe/Si-based crystallization products, and do not prevent the solid solution of Mn, so that a decline in the strength is not caused.

C: Method of Manufacturing Aluminum Alloy Brazing Sheet

Next, a method of manufacturing an aluminum alloy brazing sheet will be explained.

In order to suppress an amount of intermetallic compounds in a core material, an amount of heat to be applied to the core material in various processes between a casting process and a hot rolling process should be controlled so as to be small. Especially, a cooling rate is significant during a casting process of the core material. The faster the cooling rate, the smaller an amount of the intermetallic compounds. During the casting process, the cooling is carried out by a DC method, and a casting rate V (mm/min) and an amount of cooling water (kg/min×cm) exert a large influence on the amount of the intermetallic compounds as factors for determining the cooling rate during the casting process.

It has been found that a desirable metal texture can be obtained when the casting rate V (mm/min) and the amount of cooling water (kg/min×cm) satisfy the following formula (1):

$$25 \leq 0.4 \times V + W \quad (1)$$

Although other conditions for the casting process are not especially subjected to limitations, it is preferable that a temperature of a molten metal falls within the range of about 670-about 800° C., and that a height of a metal head falls within a range of about 50-about 150 mm. Note, although respective casting processes for sacrificial anode and filler materials are not especially subjected to limitations, it is preferable that each of these processes is carried out by using the DC method, that a temperature of a molten metal falls within a range of about 670-about 800° C., and that a height of a metal head falls within a range of about 50-about 150 mm.

Next, a combining process, a heating process for a composite material, and a hot clad rolling process will be explained.

The aluminum alloys of the core material, sacrificial anode material and filler material, which are cast by the aforesaid method, are subjected to a combining process. In the combining process, the core material, sacrificial anode material and/or filler material are combined with each other so as to prepare three composite materials: a 2-ply composite material in which the cast filler material is applied to one surface of the cast core material; a 3-ply composite material in which the respective cast filler materials are applied to both surfaces of the core material; and a 3-ply composite material in which the filler material and the sacrificial anode material are applied to the respective surfaces of the core material. Before the hot clad rolling process, each of the composite materials has a thickness falling within a range of about 250-about 800 mm, preferably, a range of about 300-about 600 mm.

After the combining process, each of the composite materials is subjected to the heating process. In the heating process, each of the composite materials is held at a heating temperature falling within a range of about 400-about 500° C. over a time period falling within a range of 0-about 10 hrs. Accordingly, it is possible to suppress excess separation of intermetallic compounds during the heating process. When the heating temperature is less than about 400° C., since each of the composite materials has a large resistance to deformation during the following hot clad rolling process, there may be a case where it is difficult to carry out the hot clad rolling process. On the other hand, when the heating temperature exceeds about 500° C. and/or when the heating/holding time exceeds 10 hrs, the intermetallic compounds are excessively separated so that it is impossible to ultimately obtain a suitable distribution of the intermetallic compounds. Thus, there may be a case where the heating/holding time is zero, as stated hereinafter. Therefore, as conditions for the heating process prior to the hot clad rolling process, the heating temperature of about 400-about 500° C. and the heating/holding time of 0-10 hrs are selected. As preferable conditions for the heating process, the heating temperature of about 400-about 480° C. and the heating/holding time of about 2-about 5 hrs are selected.

In the heating process, in order to obtain a desirable distribution of separated products, the heating time should be set as short as possible. Thus, when each of the composite materials attains a temperature falling within the range of about 400-about 500° C., it may be immediately subjected to the following hot clad rolling process without being held at the attained temperature. In this case, the heating/holding time is defined as zero. Nevertheless, when each of the composite materials as a whole is not uniformly heated, since a defective clad pressure-joining may be caused during the hot clad rolling process, it is preferable to set a heating/holding time falling within the range of about 2-about 5 hrs.

After the heating process, each of the composite materials is immediately subjected to the hot clad rolling process. Before the temperature of the composite material substantially falls to a temperature of less than about 400° C., the hot clad rolling process is started. During the hot clad rolling process, since a separation of the intermetallic compounds is facilitated due to influence of strain exerted on the composite material, it is very significant that the hot clad rolling process is finished at a short time.

A time period, which is counted from a start of the hot clad rolling process to which each of the composite materials is subjected, and which is taken to reduce an initial thickness of the composite materials falling within the range of 250-800 mm by 50 mm, is defined as a step in which either the core material and the filler material(s) or the core material, the filler material and the sacrificial anode material are pressure-joined to each other to thereby produce a clad material. A control is carried out so that the time period of the aforesaid step is at most 5 min, and a control is carried out so that a temperature of the clad materials falls within the range of about 400-about 450° C. Thus, it is possible to suppress an excess separation of the intermetallic compounds in the core material.

When the time period, which is counted from the rolling start, and which is taken to reduce the thickness of the clad material by 50 mm, exceeds 5 min, and/or when the temperature of the clad material exceeds 450° C. at the time when the thickness of the clad material is reduced by 50 mm, the intermetallic compounds are excessively separated in the core material. Also, as stated above, although the heating temperature in the heating process must be at least 400° C., the temperature of the clad material must not be less than 400° C. at the time when the thickness of the clad material is reduced by 50 mm. Thus, the time period, which is counted from the start of the hot clad rolling process, and which is taken to reduce the thickness of the clad material by 50 mm, is regulated so as to be at most 5 min, and the temperature of the clad material is regulated so as to fall within the range of about 400-about 450° C. at the time when the thickness of the clad material is reduced by 50 mm.

Further, a time period between the time when the thickness of the clad material is reduced by 50 mm so that the respective materials of the clad material are sufficiently pressure-joined to each other and a time when the thickness of the clad material is reduced to 20 mm is defined as a step in which a temperature of the clad material is relatively high, and in which an amount of strain exerted on the clad material is very large. Thus, a time period which is taken to carry out this step is regulated so as to be at most 10 min, and the temperature of the clad material is regulated so as to fall within a range of about 300-about 400° C. at the time when the thickness of the clad material is reduced to 20 mm, so that it is possible to suppress the excessive separation of the intermetallic compounds in the core material.

When the time period, which is counted from the time when the thickness of the clad material is reduced by 50 mm to the time when the thickness of the clad material is reduced to 20 mm, exceeds 10 min, and/or when the temperature of the clad material exceeds 400° C. at the time when the thickness of the clad material is reduced to 20 mm, the intermetallic compounds are excessively separated in the core material. Also, as stated above, although the heating temperature in the heating process must be at least 400° C., it is difficult to set the temperature of the clad material at less than 300° C. at the time when the thickness of the clad material is reduced to 20 mm. Thus, the time period, which is counted from the time when the thickness of the clad material is reduced by 50 mm to the time when the thickness of the clad material is reduced to 20 mm during the hot clad rolling process, is regulated so as to be at most 10 min, and the temperature of the clad material is regulated so as to fall within the range of about 300-about 400° C. at the time when the thickness of the clad is reduced to 20 mm.

After the thickness of the clad material is reduced to 20 mm, since the temperature of the clad material becomes low, progress of the separation of the intermetallic compounds is made difficult. Accordingly, after this time point, although the hot clad rolling process is not especially subjected to temporal limitations, a time period, which is counted from the rolling start to the rolling end in the hot clad rolling process, should be regulated so as to be at most 40 min. When this time period exceeds 40 min, the intermetallic compounds are excessively separated so that it is extremely difficult to ultimately obtain a suitable distribution of the intermetallic compounds. Preferably, the time period, which is counted from the rolling start to the rolling end in the hot clad rolling process is at most 35 min.

As stated above, when the time period for each of the steps of the hot clad rolling process, the temperature in each of the steps, and/or the total time period for all the steps fall out of the aforesaid respective ranges, it is difficult to obtain a suitable distribution of the intermetallic compounds. In order to suppress the separation of the intermetallic compounds after the clad material is wound up into a coil at the end of the hot clad rolling process, it is preferable to set a final temperature of the hot clad rolling process at most 250° C.

As stated above, although a specific means for controlling the time period for each of the steps of the hot clad rolling process, the temperature in each of the steps, and the total time period for the steps fall within the aforesaid respective ranges is not especially limited, for example, it is possible to use a feedback means for controlling the rolling rate, the rolling reduction, the amount of rolling oil and so forth so that these parameters fall within the respective ranges.

Note, in general, in a method of manufacturing a brazing sheet, although a core material is subjected to a homogenization process after a casting process, in the present invention, it is preferable to omit the homogenization process for the core material in view of the suppression of the separation of the intermetallic compounds.

After the hot clad rolling process, although the clad material is subjected to a cold rolling process, it may be once or twice subjected to an intermediate annealing process until a final thickness is given to the clad material. It is possible to carry out the intermediate annealing process at a temperature of about 150-about 550 C. After the final intermediate annealing process is carried out, a rolling reduction rate, at which the clad material is rolled to a final thickness, ordinarily falls within a range of about 10-about 80%. Usually, the final thickness of the clad material falls within a range of about 0.1-about 0.6 mm. After the clad material is rolled by the cold rolling process to the final thickness, it may be subjected to a finishing annealing process for improving a formability of the clad material. It is preferable to carry out the finishing annealing process at a temperature falling within the range of about 150-about 550° C.

Although the thickness of the aluminum alloy brazing sheet according to the present invention and clad rates of the brazing and sacrificial anode materials are not especially limited, a thin brazing sheet having a thickness of at most 0.6 mm may be produced when it is used as a tube member for an automobile heat exchanger. Nevertheless, the thickness of the brazing sheet is not limited within this range, and a relatively thick brazing sheet having a thickness falling within a range of about 0.6-about 5.0 mm may be used. Ordinarily, a clad rate, at which either the filler material ply or the sacrificial anode material ply is cladded on one surface of the core material, falls within a range of about 3-about 20%.

EXAMPLES

Although the present invention will be further explained in detail based on examples of the present invention and comparative examples below, the present invention cannot be limited to these examples.

Core material alloys composed of components as shown in Table 1, filler material alloys composed of components as shown in Table 2, and sacrificial anode material alloys composed of components as shown in Table 3 were cast by using a DC casting process, and then each of the cast alloys was machined and finished so that both surfaces thereof were shaved. A right side value of the formula (1) representing the relationship between the casting speed and the amount of cooling water, which was set when each of the core material alloys was cast, is shown in Table 4. Note that each of the core material alloys was subjected to no homogenization process.

TABLE 1

| | Alloy References | Alloy Composition (mass %) | | | | | | | | | |
|---|---|---|---|---|---|---|---|---|---|---|---|
| | | Si | Fe | Cu | Mn | Mg | Ti | Zr | Cr | V | Al |
| Examples of Invention | A1 | 0.5 | 0.4 | 0.5 | 1.1 | — | 0.05 | 0.05 | — | — | Balance |
| | A2 | 0.5 | 0.6 | 0.5 | 1.1 | 0.5 | 0.05 | 0.05 | — | — | Balance |
| | A3 | 1.0 | 0.8 | 1.0 | 1.5 | 0.05 | — | — | — | — | Balance |

TABLE 1-continued

|  | Alloy References | Alloy Composition (mass %) | | | | | | | | |
|---|---|---|---|---|---|---|---|---|---|---|
|  |  | Si | Fe | Cu | Mn | Mg | Ti | Zr | Cr | V | Al |
|  | A4 | 0.05 | 1.0 | 0.5 | 1.1 | — | — | — | 0.05 | 0.05 | Balance |
|  | A5 | 0.5 | 0.05 | 0.05 | 1.1 | — | 0.30 | — | — | — | Balance |
|  | A6 | 0.5 | 0.2 | 0.5 | 0.6 | — | — | 0.30 | — | — | Balance |
|  | A7 | 1.2 | 0.2 | 0.5 | 1.8 | — | — | — | — | — | Balance |
|  | A8 | 0.5 | 0.2 | 1.2 | 1.1 | — | — | — | — | — | Balance |
| Comparative | A9 | 1.4 | 0.2 | 0.2 | 1.1 | — | — | — | — | — | Balance |
| Examples | A10 | 0.5 | 0.2 | 0.7 | 1.1 | 0.6 | — | 0.15 | — | — | Balance |
|  | A11 | 0.8 | 1.2 | 0.5 | 1.5 | — | 0.15 | 0.15 | — | — | Balance |
|  | A12 | 0.8 | 0.2 | 0.5 | 1.5 | — | 0.40 | 0.40 | 0.40 | 0.40 | Balance |
|  | A13 | 0.8 | 0.6 | 0.5 | 2.0 | — | — | — | — | — | Balance |
|  | A14 | 0.8 | 0.6 | 1.4 | 1.1 | — | — | — | — | — | Balance |
|  | A15 | 0.5 | 0.4 | 0.5 | 0.4 | — | 0.05 | 0.05 | — | — | Balance |
|  | A16 | 0.5 | 0.4 | 0.01 | 1.1 | — | 0.05 | 0.05 | — | — | Balance |
|  | A17 | 0.01 | 0.4 | 0.2 | 1.1 | — | 0.05 | 0.05 | — | — | Balance |

TABLE 2

|  | Alloy References | Alloy Composition (mass %) | | | |
|---|---|---|---|---|---|
|  |  | Si | Fe | Zn | Al |
| Examples of Invention | B1 | 10.0 | 0.4 | — | Balance |
|  | B2 | 2.5 | 0.05 | — | Balance |
|  | B3 | 3.5 | 0.1 | — | Balance |
|  | B4 | 7.0 | 0.2 | — | Balance |
|  | B5 | 12.0 | 0.6 | — | Balance |
|  | B6 | 3.5 | 0.8 | 0.3 | Balance |
|  | B7 | 7.0 | 1.0 | 2.0 | Balance |
|  | B8 | 10.0 | 0.2 | 5.5 | Balance |
| Comparative Examples | B9 | 10.0 | 0.2 | 6.0 | Balance |
|  | B10 | 10.0 | 0.2 | 0.2 | Balance |
|  | B11 | 2.0 | 0.2 | — | Balance |
|  | B12 | 14.0 | 0.2 | — | Balance |
|  | B13 | 10.0 | 1.2 | — | Balance |

TABLE 3

|  | Alloy References | Alloy Composition (mass %) | | | | | | | | | |
|---|---|---|---|---|---|---|---|---|---|---|---|
|  |  | Zn | Si | Fe | Mn | Mg | Ti | Zr | Cr | V | Al |
| Examples of Invention | C1 | 4.0 | 0.2 | 0.2 | — | — | — | — | — | — | Balance |
|  | C2 | 0.5 | 0.05 | 0.05 | — | — | 0.15 | — | — | — | Balance |
|  | C3 | 5.0 | 0.4 | 0.4 | 0.05 | — | — | — | — | 0.15 | Balance |
|  | C4 | 6.0 | 0.6 | 0.6 | 1.5 | — | — | — | — | — | Balance |
|  | C5 | 4.0 | 1.2 | 0.2 | — | — | — | — | — | — | Balance |
|  | C6 | 4.0 | 1.5 | 0.2 | — | — | 0.05 | 0.05 | 0.05 | 0.05 | Balance |
|  | C7 | 4.0 | 0.2 | 1.5 | — | — | — | — | — | — | Balance |
|  | C8 | 4.0 | 0.2 | 2.0 | — | — | 0.3 | — | — | — | Balance |
|  | C9 | 4.0 | 0.2 | 0.2 | 1.8 | — | — | 0.3 | — | — | Balance |
|  | C10 | 4.0 | 0.2 | 0.2 | — | 0.5 | — | — | 0.3 | — | Balance |
|  | C11 | 4.0 | 0.2 | 0.2 | — | 2.0 | — | — | — | 0.3 | Balance |
|  | C12 | 4.0 | 0.2 | 0.2 | — | 3.0 | — | — | — | — | Balance |
| Comparative Examples | C13 | 4.0 | 1.7 | 0.2 | — | — | — | — | — | — | Balance |
|  | C14 | 4.0 | 0.2 | 2.2 | — | — | — | — | — | — | Balance |
|  | C15 | 4.0 | 0.2 | 0.2 | 2.0 | — | 4.0 | 4.0 | 4.0 | 4.0 | Balance |
|  | C16 | 0.3 | 0.2 | 0.2 | — | — | — | — | — | — | Balance |
|  | C17 | 6.5 | 0.2 | 0.2 | — | — | — | — | — | — | Balance |
|  | C18 | 4.0 | 0.2 | 0.2 | — | 3.5 | — | — | — | — | Balance |

TABLE 4

|  |  | Casting Speed V (mm/min) | Amount of Cooling Water W (kg/min × cm) | Right Value Of Formula (1) |
|---|---|---|---|---|
| Examples of invention | D1 | 50 | 6 | 26 |
|  | D2 | 55 | 4 | 26 |
|  | D3 | 60 | 2 | 26 |
|  | D4 | 65 | 1 | 27 |
|  | D5 | 80 | 2 | 34 |
|  | D6 | 100 | 1 | 41 |
| Comparative Examples | D7 | 50 | 4 | 24 |
|  | D8 | 55 | 2 | 24 |
|  | D9 | 58 | 1 | 24.2 |

With using of the aforesaid alloys, each of the core material alloys was combined with a filler material alloy shown in Table 2, so that the filler material alloy concerned was applied as a cladding 1 to one surface of the core material alloy, and/or so that the filler material alloy shown in Table 2 or a sacrificial anode material alloy shown in Table 3 was applied as a cladding 2 to the other surface of the core material alloy, whereby a variety of composite materials was produced. Note, among the composite materials, there were 2-ply composite materials including no cladding 2. Each of the composite materials was subjected to a heating process and a hot clad rolling process, to thereby produce a 2-ply or 3-ply clad material having a thickness of 3.5 mm. The conditions of the heating and hot clad rolling processes are shown in Table 5. Also, the combinations of the core material alloys, the claddings 1 and the claddings 2 are shown in Tables 6 and 7.

TABLE 5

|  |  | Heating Process | | Hot Clad Rolling Process | | | | |
|---|---|---|---|---|---|---|---|---|
|  |  | | | Reduction Of Thickness By 50 mm | | Reduction Of Thickness To 20 mm | | To End Of Hot Rokking Process |
|  |  | Time Period (h) | Temperature (° C.) | Time Period (min) | Attained Temperature (° C.) | Time Period (min) | Attained Temperature (° C.) | Time Period (min) |
| Examples Of Invention | E1 | 5 | 480 | 2 | 430 | 7 | 360 | 23 |
|  | E2 | 5 | 480 | 5 | 420 | 7 | 340 | 33 |
|  | E3 | 5 | 480 | 2 | 430 | 10 | 340 | 33 |
|  | E4 | 8 | 500 | 2 | 450 | 5 | 380 | 21 |
|  | E5 | 1 | 410 | 2 | 400 | 5 | 300 | 20 |
| Comparative Examples | E6 | 15 | 480 | 2 | 430 | 7 | 360 | 23 |
|  | E7 | 5 | 520 | 2 | 430 | 7 | 360 | 23 |
|  | E8 | 5 | 480 | 10 | 430 | 7 | 360 | 23 |
|  | E9 | 5 | 480 | 2 | 470 | 7 | 360 | 23 |
|  | E10 | 5 | 480 | 2 | 430 | 15 | 360 | 23 |
|  | E11 | 5 | 480 | 2 | 430 | 7 | 420 | 23 |
|  | E12 | 5 | 480 | 2 | 430 | 7 | 360 | 45 |
|  | E13 | 5 | 380 | — | — | — | — | — |

TABLE 6

|  | No. | Core Material | Cladding1 | Cladding 2 | Prodiction Process | | Productivity |
|---|---|---|---|---|---|---|---|
| Examples Of Invention | 1 | A1 | B1 | C1 | D5 | E1 | o |
|  | 2 | A2 | B2 | C2 | D5 | E1 | o |
|  | 3 | A3 | B3 | C3 | D5 | E1 | o |
|  | 4 | A4 | B4 | C4 | D5 | E1 | o |
|  | 5 | A5 | B5 | C5 | D5 | E1 | o |
|  | 6 | A6 | B6 | C6 | D5 | E1 | o |
|  | 7 | A7 | B7 | C7 | D5 | E1 | o |
|  | 8 | A8 | B8 | C8 | D5 | E1 | o |
|  | 9 | A1 | B1 | C9 | D5 | E1 | o |
|  | 10 | A1 | B1 | C10 | D5 | E1 | o |
|  | 11 | A1 | B1 | C11 | D5 | E1 | o |
|  | 12 | A1 | B1 | C12 | D5 | E1 | o |
| Comparative Examples | 13 | A9 | B1 | C1 | D5 | E1 | o |
|  | 14 | A10 | B1 | C1 | D5 | E1 | o |
|  | 15 | A11 | B1 | C1 | D5 | E1 | o |
|  | 16 | A12 | B1 | C1 | D5 | E1 | x |
|  | 17 | A13 | B1 | C1 | D5 | E1 | x |
|  | 18 | A14 | B1 | C1 | D5 | E1 | x |
|  | 19 | A15 | B1 | C1 | D5 | E1 | o |
|  | 20 | A16 | B1 | C1 | D5 | E1 | o |
|  | 21 | A17 | B1 | C1 | D5 | E1 | o |
|  | 22 | A1 | B9 | C1 | D5 | E1 | o |
|  | 23 | A1 | B10 | C1 | D5 | E1 | o |
|  | 24 | A1 | B11 | C1 | D5 | E1 | o |
|  | 25 | A1 | B12 | C1 | D5 | E1 | o |
|  | 26 | A1 | B13 | C1 | D5 | E1 | o |
|  | 27 | A1 | B1 | C13 | D5 | E1 | o |
|  | 28 | A1 | B1 | C14 | D5 | E1 | x |
|  | 29 | A1 | B1 | C15 | D5 | E1 | x |
|  | 30 | A1 | B1 | C16 | D5 | E1 | o |
|  | 31 | A1 | B1 | C17 | D5 | E1 | o |
|  | 32 | A1 | B1 | C18 | D5 | E1 | x |

TABLE 7

|  | No. | Core Material | Cladding1 | Cladding2 | Production Process | | Productivity |
|---|---|---|---|---|---|---|---|
| Examples Of Invention | 33 | A1 | B1 | B1 | D1 | E1 | o |
|  | 34 | A1 | B2 | B1 | D2 | E1 | o |
|  | 35 | A1 | B3 | B1 | D3 | E1 | o |
|  | 36 | A1 | B4 | B1 | D4 | E1 | o |
|  | 37 | A1 | B5 | B1 | D5 | E1 | o |
|  | 38 | A1 | B6 | B1 | D6 | E1 | o |
|  | 39 | A1 | B7 | B1 | D5 | E1 | o |
|  | 40 | A1 | B8 | None | D5 | E2 | o |

TABLE 7-continued

|  | No. | Core Material | Cladding1 | Cladding2 | Production Process | | Productivity |
|---|---|---|---|---|---|---|---|
|  | 41 | A1 | B1 | None | D5 | E3 | o |
|  | 42 | A1 | B1 | None | D5 | E4 | o |
|  | 43 | A1 | B1 | None | D5 | E5 | o |
| Comparative Examples | 44 | A1 | B1 | C1 | D7 | E1 | o |
|  | 45 | A1 | B1 | C1 | D8 | E1 | o |
|  | 46 | A1 | B1 | C1 | D9 | E1 | o |
|  | 47 | A1 | B1 | C1 | D4 | E6 | o |
|  | 48 | A1 | B1 | C1 | D4 | E7 | o |
|  | 49 | A1 | B1 | C1 | D4 | E8 | o |
|  | 50 | A1 | B1 | C1 | D4 | E9 | o |
|  | 51 | A1 | B1 | C1 | D4 | E10 | o |
|  | 52 | A1 | B1 | C1 | D4 | E11 | o |
|  | 53 | A1 | B1 | C1 | D4 | E12 | o |
|  | 54 | A1 | B1 | C1 | D4 | E13 | x |
|  | 55 | A1 | B1 | None | D7 | E1 | o |
|  | 56 | A1 | B1 | None | D8 | E1 | o |
|  | 57 | A1 | B1 | None | D9 | E1 | o |
|  | 58 | A1 | B1 | None | D4 | E6 | o |
|  | 59 | A1 | B1 | None | D4 | E7 | o |
|  | 60 | A1 | B1 | None | D4 | E8 | o |
|  | 61 | A1 | B1 | B1 | D4 | E9 | o |
|  | 62 | A1 | B1 | B1 | D4 | E10 | o |
|  | 63 | A1 | B1 | B1 | D4 | E11 | o |
|  | 64 | A1 | B1 | B1 | D4 | E12 | o |
|  | 65 | A1 | B1 | B1 | D4 | E13 | x |

Each of the aforesaid clad materials was subjected to an intermediate annealing process at a temperature of 400° C. over a time period of 5 hrs, and is then subjected to a final cold rolling process to thereby produce a brazing sheet sample exhibiting an H1n refining and having a thickness of 0.5 mm. A cold rolling reduction rate, at which each of the clad materials was rolled after the intermediate annealing process, was 40%. When each of the clad materials could be rolled to the final thickness of 0.5 mm under conditions shown in Tables 4 and 5 by a production process shown in Tables 6 and 7 without occurrence of any troubles, a productivity was estimated as "o" in Tables 6 and 7. When a sacrificial anode material of a clad material was excessively extended and/or when a sacrificial anode material could not sufficiently pressure-joined to a core material, a productivity was estimated as "x" in Tables 6 and 7.

Each of the aforesaid brazing sheet samples was estimated in a variety of manners as stated hereinafter. The results are shown in Tables 8 and 9. Note, since a brazing sheet sample could not produced from each of the clad materials estimated as "x", it was impossible to carry out the estimations on these clad materials.

TABLE 8

| | No. | Area Percentage Of Intermetallic Compounds (%) | Mn Solid Solution Amount In Core Material After Brazing (mass %) | Tensile Strength After Brazing (MPa) | Brazing Property | Corrosion Depth Brazing Material | Sacrificial Anode material |
|---|---|---|---|---|---|---|---|
| Examples Of Invention | 1 | 3.5 | 0.32 | 179(○) | ○ | — | ○ |
| | 2 | 3.5 | 0.33 | 197(○) | ○ | — | ○ |
| | 3 | 3.2 | 0.38 | 182(○) | ○ | — | ○ |
| | 4 | 3.8 | 0.41 | 178(○) | ○ | — | ○ |
| | 5 | 3.2 | 0.31 | 173(○) | ○ | — | ○ |
| | 6 | 2.6 | 0.23 | 165(○) | ○ | ○ | ○ |
| | 7 | 4.1 | 0.45 | 189(○) | ○ | ○ | ○ |
| | 8 | 3.2 | 0.35 | 193(○) | ○ | ○ | ○ |
| | 9 | 3.4 | 0.32 | 180(○) | ○ | — | ○ |
| | 10 | 3.6 | 0.33 | 180(○) | ○ | — | ○ |
| | 11 | 3.3 | 0.30 | 189(○) | ○ | — | ○ |
| | 12 | 3.6 | 0.30 | 188(○) | ○ | — | ○ |
| Comparative Examples | 13 | 3.8 | 0.28 | 186(○) | x | — | ○ |
| | 14 | 3.9 | 0.32 | 196(○) | x | — | ○ |
| | 15 | 3.9 | 0.33 | 177(○) | x | — | ○ |
| | 16 | — | — | — | — | — | — |
| | 17 | — | — | — | — | — | — |
| | 18 | — | — | — | — | — | — |
| | 19 | 2.7 | 0.18 | 132(x) | ○ | — | ○ |
| | 20 | 3.1 | 0.40 | 129(x) | ○ | — | ○ |
| | 21 | 3.1 | 0.32 | 135(x) | ○ | — | ○ |
| | 22 | 3.5 | 0.31 | 176(○) | ○ | x | ○ |
| | 23 | 3.4 | 0.30 | 178(○) | ○ | x | ○ |
| | 24 | 3.5 | 0.32 | 178(○) | x | — | ○ |
| | 25 | 3.5 | 0.30 | 181(○) | x | — | ○ |
| | 26 | 3.2 | 0.34 | 179(○) | x | — | ○ |
| | 27 | 3.6 | 0.31 | 179(○) | ○ | — | x |
| | 28 | — | — | — | — | — | — |
| | 29 | — | — | — | — | — | — |
| | 30 | 3.1 | 0.32 | 178(○) | ○ | — | x |
| | 31 | 3.3 | 0.33 | 176(○) | ○ | — | x |
| | 32 | — | — | — | — | — | — |

(Measurement of Area Percentage of Intermetallic Compounds)

In each of the brazing sheet samples, an L-ST face of the core material was exposed by a polishing process, and was observed by a scanning transmission electron microscope (STEM) for a measurement of an area percentage of the intermetallic compounds. In particular, in the observed portion, a film thickness of the core material was measured, using an electron energy-loss spectroscopy (EELS), and only areas having the film thickness falling within a range of 0.1-0.15 μm were observed by the STEM. In each of the brazing sheet samples, ten view fields were selected and observed at a 10,000-power. Then, by subjecting each of the STEM photographs of the view fields to an image analysis, an area percentage of the intermetallic compounds having a size falling within a range of 0.2-0.5 μm was measured.

(Measurement of Mn Solid Solution Amount in Core Material after Brazing)

Each of the brazing sheet samples was subjected to a thermal processing (corresponding to a heating process for brazing) at a temperature of 600 C over a time period of 3 min, and was then subjected to a caustic etching process so that the cladding(s) was removed. Thereafter, the core material was resolved in a phenol solution, and the un-resolvable intermetallic compounds were filtered out of the solution. Then, the intermetallic compounds were subjected to a measuring process using an optical emission spectrometer, so that the Mn solid solution amount was measured.

(Measurement of Tensile Strength after Brazing)

Each of the brazing sheet samples was subjected to a thermal processing (corresponding to a heating process for brazing) at a temperature of 600° C. over a time period of 3 min, and was then subjected to a tensile test under the conditions of a tensile speed of 10 mm/min and a gage length of 50 mm in accordance with the JIS Z2241 method, to thereby obtain a stress-strain characteristic curve. Thereafter, a tensile strength of the tested sample was read from the stress-strain characteristic curve. When the sample had a tensile strength of at least 150 MPa, it was estimated as being acceptable (○). When the sample had a tensile strength of less than 150 MPa, it was estimated as being unacceptable (x).

(Evaluation of Brazing Property)

JIS 3003 alloy was corrugated and shaped into a fin, and was applied to the filler material surface of each of the brazing sheet samples. Then, the sample was immersed in an aqueous solution containing 5% fluoride flux, and was subjected to a heating process for brazing at a temperature of 600° C. over a time period of 3 min. In this core sample, when a fin joining rate was at least 95%, and when no melting occurred in the sample, a brazing property was evaluated as being acceptable (○). When a fin joining rate was less than 95%, and when a melting occurred in the sample, a brazing property was evaluated as being unacceptable (x).

(Measurement of Depth of Corrosion)

After each of the brazing sheet samples was subjected to a thermal processing (corresponding to a heating process for brazing) at a temperature of 600° C. over a time period of 3 min, it was cut into sample pieces having a size of 50 mm×50 mm. In each of the sample pieces, a rear surface, which was defined as a surface opposite to a test surface of the sample piece, was masked with a resin. Note, when the sample piece had the filler material containing Zn, the test surface was defined as the surface of the filler material, and, when the sample piece had the cladded sacrificial anode material, the test surface was defined as the surface of the sacrificial anode material. Also, note, in the sample pieces, in which a test surface could not be defined as stated above, an evaluation of corrosion resistance was not carried out. When the test surface was defined as the surface of the filler material, the test piece concerned was subjected to an SWAAT test based on ASTM-G85 over a time period of 500 hrs. When corrosive pierces do not occur in the test piece, it was evaluated as being acceptable (○). When corrosive pierces occur in the test piece, it was evaluated as being unacceptable (x). When the test surface was defined as the surface of the sacrificial anode material, the test piece concerned was subjected to a 3-month cycle immersion test, in one cycle of which the test piece was immersed in an 88° C. hot water containing Cl⁻ 500 ppm, $SO_4^{2-}$ 100 ppm and $Cu^{2+}$ 10 ppm over a time period of 8 hrs, and was then left at a room temperature over a time period of 16 hrs. When corrosive pierces do not occur in the test piece, it was evaluated as being acceptable (○). When corrosive pierces occur in the test piece, it was evaluated as being unacceptable (x).

Each of Examples 1 to 12 and 33 to 43 of the present invention satisfied the requirements regulated by the present invention, and all of the productivity, the area percentage of the intermetallic compounds, the Mn solid solution amount after the brazing, the tensile strength after the brazing, the brazing property and the corrosion depth were evaluated as being acceptable. Note that each of Examples 6 to 8 and 38 to 40 had the filler material containing Zn was especially superior concerning the corrosion depth.

In Comparative Example 13, the core material was melted during the brazing process due to the fact that the Si component of the core material was too large, and thus the brazing property was evaluated as being unacceptable.

In Comparative Example 14, the core material was not sufficiently joined to the fin due to the fact that the Mg component of the core material was too large, and thus the brazing property was evaluated as being unacceptable.

In Comparative Example 15, the core material was eroded by the filler material due to the fact that the Fe component of the core material was too large, and thus the brazing property was evaluated as being unacceptable.

In Comparative Example 16, the crack occurred in the clad material during the rolling process due to the fact that the Ti, Cr, Zr and V components of the core material was too large, and thus no brazing sheet was manufactured.

In Comparative Example 17, the crack occurred in the clad material during the rolling process due to the fact that the Mn component of the core material was too large, and thus no brazing sheet was manufactured.

In Comparative Example 18, the crack occurred in the core material during the casting process due to the fact that the Cu component of the core material was too large, and thus no brazing sheet was manufactured.

In Comparative Example 19, the Mn solid solution amount after the brazing was too small due to the fact that the Mn component of the core material was too small. As a result, the tensile strength after the brazing was evaluated as being unacceptable.

In Comparative Example 20, the tensile strength after the brazing was evaluated as being unacceptable due to the fact that the Cu component of the core material was too small.

In Comparative Example 21, the tensile strength after the brazing was evaluated as being unacceptable due to the fact that the Si component of the core material was too small.

In Comparative Example 22, the corrosion resistance was evaluated as being unacceptable due to the fact that the Zn component of the filler material was too large.

In Comparative Example 23, the corrosion resistance was evaluated as being unacceptable due to the fact that the Zn component of the filler material was too small.

In Comparative Example 24, the core material was not sufficiently joined to the fin due to the fact that the Si component of the filler material was too small, and thus the brazing property was evaluated as being unacceptable.

In Comparative Example 25, the fin was melted due to the fact that the Si component of the filler material was too large, and thus the brazing property was evaluated as being unacceptable.

In Comparative Example 26, the filler material was not sufficiently joined to the fin due to the fact that the Fe component of the filler material was too large, and thus the brazing property was evaluated as being unacceptable.

In Comparative Example 27, the corrosion resistance was evaluated as being unacceptable due to the fact that the Si component of the core material was too large.

In Comparative Example 28, the crack occurred in the clad material during the rolling process due to the fact that the Fe component of the sacrificial anode material was too large, and thus no brazing sheet was manufactured.

In Comparative Example 29, the crack occurred in the clad material during the rolling process due to the fact that the Mn, Cr, Zr, Ti and V components of the sacrificial anode material was too large, and thus no brazing sheet was manufactured.

In Comparative Example 30, the corrosion resistance was evaluated as being unacceptable due to the fact that the Zn component of the sacrificial anode material was too small.

In Comparative Example 31, the corrosion resistance was evaluated as being unacceptable due to the fact that the Zn component of the sacrificial anode material was too large.

In Comparative Example 32, the core material and the sacrificial anode material was not pressure-joined during the hot rolling process due to the fact that the Mg component of the sacrificial anode material was too large, and thus no brazing sheet was manufactured.

In each of Comparative Examples 44 to 46 and 55 to 47, the area percentage of the intermetallic compounds was too large and the Mn solid solution amount in the core material after the brazing was too small due to the fact that the right value of the formula (1) for the core material casting conditions was too small. As a result, the tensile strength after the brazing was evaluated as being unacceptable.

In each of Comparative Examples 47 and 58, the area percentage of the intermetallic compounds was too large and the Mn solid solution amount in the core material after the brazing was too small due to the fact that the heating/holding time in the heating process was too long. As a result, the tensile strength after the brazing was evaluated as being unacceptable.

In each of Comparative Examples 48 and 59, the area percentage of the intermetallic compounds was too large and the Mn solid solution amount in the core material after the brazing was too small due to the fact that the heating temperature was too high. As a result, the tensile strength after the brazing was evaluated as being unacceptable.

In each of Comparative Examples 49 and 60, the area percentage of the intermetallic compounds was too large and the Mn solid solution amount in the core material after the brazing was too small due to the fact that the time period, during which the composite material was reduced by 50 mm in the hot clad rolling process, was too long. As a result, the tensile strength after the brazing was evaluated as being unacceptable.

In each of Comparative Examples 50 and 61, the area percentage of the intermetallic compounds was too large and the Mn solid solution amount in the core material after the brazing was too small due to the fact that the temperature of the brazing sheet at the time when the thickness of the composite material was reduced by 50 mm in the hot clad rolling process was too high. As a result, the tensile strength after the brazing was evaluated as being unacceptable.

In each of Comparative Examples 51 and 62, the area percentage of the intermetallic compounds was too large and the Mn solid solution amount in the core material after the brazing was too small due to the fact that the time period, which was counted from the time when the thickness of the composite material was reduced by 50 mm to the time when the thickness of the composite material was reduced to 20 mm in the hot clad rolling process, was too long. As a result, the tensile strength after the brazing was evaluated as being unacceptable.

In each of Comparative Examples 52 and 63, the area percentage of the intermetallic compounds was too large and the Mn solid solution amount in the core material after the brazing was too small due to the fact that the temperature of the brazing sheet at the time when the thickness of the composite material was reduced to 20 mm in the hot clad rolling process was too high. As a result, the tensile strength after the brazing was evaluated as being unacceptable.

In each of Comparative Examples 53 and 64, the area percentage of the intermetallic compounds was too large and the Mn solid solution amount in the core material after the brazing was too small due to the fact that the time period, during which the hot clad rolling process was carried out, was too long. As a result, the tensile strength after the brazing was evaluated as being unacceptable.

In each of Comparative Examples 54 and 65, the pressure-joining of the composite material could not sufficiently carried out during the hot clad rolling process due to the fact that the heating temperature in the heating process was too low, and thus no brazing sheet was manufactured.

INDUSTRIAL APPLICABILITY

The aluminum alloy brazing sheet according to the present invention exhibits a high strength after brazing, and features not only superior brazing properties such as a fin joining rate, an erosion resistance and so forth, but also a superior corrosion resistance. Especially, the aluminum alloy brazing sheet can be suitably utilized as a tube member in a heat exchanger for an automobile due to a lightweight nature and a high thermal conductivity thereof.

The invention claimed is:

1. A method of manufacturing a high strength aluminum alloy brazing sheet comprising:
    casting a core material to provide a cast core material;
    casting a filler material to provide a cast filler material;
    combining the cast core material with the cast filler material so that the cast filler material Is cladded to at least one surface of the cast core material to produce a composite material;
    a heating process wherein the composite material is heated and held after the combining to form a heat treated composite material; and
    hot clad rolling the heat treated composite material,
    wherein the core material is cast at a casting speed V (mm/min) with application of an amount of cooling water W (kg/min×cm) so that the casting speed and amount of cooling water satisfy formula (1):

$$25 \leq 0.4 \times V + W \quad (1);$$

wherein the composite material is held at a temperature within a range of about 400° C. to about 500° C. over a time period of 0 hrs to about 10 hrs during the heating process;
    wherein the time period for the hot clad rolling which is counted from start of the hot clad rolling to the time taken to reduce an initial thickness of the composite material by 50 mm is at most 5 min,
    wherein the temperature of the composite material falls within a range of about 400° C. to about 450° C. when the thickness of the composite material is reduced by 50 mm;
    wherein a time period counted from the time when the thickness of the composite material is reduced by 50 mm to the time taken to reduce the thickness of the composite material to 20 mm is at most 10 min;
    wherein the temperature of the composite material is about 300° C. to about 400° C. when the thickness of the composite material is reduced to 20 mm;
    wherein a time period which is counted from the rolling start to a rolling end is at most 40 min; and
    wherein the core material comprises an aluminum alloy comprising: Si within a range of about 0.05 mass % to about 1.2 mass %, Fe within a range of about 0.05 mass % to about 1.0 mass %, Cu within a range of about 0.05 mass % to about 1.2 mass %, and Mn within a range of about 0.6 mass % to about 1.8 mass %, and as balance Al and inevitable impurities; and
    wherein an area percentage of the core material is occupied with intermetallic compounds having a size within a range of about 0.2 μm to about 0.5 μm wherein the area percentage is at most 5%; and
    wherein a solid solution amount of Mn is at least 0.2 mass % in the core material; and
    wherein the filler material comprises an Al/Si-based alloy comprising Si within a range of about 2.5 mass % to about 13.0 mass %, Fe within a range of about 0.05 mass % to about 1.0 mass %, and as balance Al and inevitable impurities.

2. The method of claim 1 wherein the aluminum alloy of the core material further comprises at least one element selected from the group consisting of Mg within a range of about 0.05 mass % to about 0.5 mass %, Ti within a range of about 0.05 mass % to about 0.3 mass %, Zr within a range of about 0.05 mass % to about 0.3 mass %, Cr within a range of about 0.05 mass % to about 0.3 mass %, and V within a range of about 0.05 mass % to about 0.3 mass %.

3. The method of claim 1 wherein the Al/Si-based alloy of filler material cladded td the the at least one surface of the core material further comprises Zn within a range of about 0.3 mass % to about 5.5 mass %.

4. The method of claim 1 wherein the composite material has a thickness of about 250 mm to about 800 mm prior to the hot clad rolling.

5. The method of claim 1 wherein the core material has not been subjected to homogenization.

6. A method of manufacturing a high strength aluminum alloy brazing sheet comprising:
casting a core material to provide a cast core material;
casting a filler material to provide a cast filler material;
casting a sacrificial anode material to provide a cast sacrificial anode material, combining the cast core material with the cast filler material and the cast sacrificial anode material so that the cast filler material is cladded to at least one surface of the cast core material and the cast sacrificial anode material is applied to another surface of the cast core material to produce a composite material;
a heating process wherein the composite material is heated and held after the combining to form a heat treated composite material; and
hot clad rolling the heat treated composite material,
wherein the core material is cast at a casting speed V (mm/min) with application of an amount of cooling water W (kg/min×cm) so that the casting speed and amount of cooling water satisfy formula (1):

$$25 \leq 0.4 \times V + W \qquad (1);$$

wherein the composite material is held at a temperature within a range of about 400° C. to about 500° C. over a time period of 0 hrs to about 10 hrs during the heating process;
wherein the time period for the hot clad rolling which is counted from start of the hot clad rolling to the time taken to reduce an initial thickness of the composite material by 50 mm is at most 5 min,
wherein the temperature of the composite material falls within a range of about 400° C. to about 450° C. when the thickness of the composite material is reduced by 50 mm;
wherein a time period counted from the time when the thickness of the composite material is reduced by 50 mm to the time taken to reduce the thickness of the composite material to 20 mm is at most 10 min,
wherein the temperature of the composite material is about 300° C. to about 400° C. when the thickness of the composite material is reduced to 20 mm;
wherein a time period which is counted from the rolling start to a rolling end is at most 40 min, and
wherein the core material comprises an aluminum alloy comprising: Si within a range of about 0.05 mass % to about 1.2 mass %, Fe within a range of about 0.05 mass % to about 1.0 mass %, Cu within a range of about 0.05 mass % to about 1.2 mass %, and Mn within a range of about 0.6 mass % to about 1.8 mass %, and as balance Al and inevitable impurities; and
wherein an area percentage of the core material is occupied with intermetallic compounds having a size within a range of about 0.2 µm to about 0.5 µm wherein the area percentage is at most 5%; and
wherein a solid solution amount of Mn is at least 0.2 mass % in the core; and
wherein the filler material comprises an Al/Si-based alloy comprising Si within a range of about 2.5 mass % to about 13.0 mass %, Fe within a range of about 0.05 mass % to about 1.0 mass %, and as balance Al and inevitable impurities; and
wherein the sacrificial anode material comprises an aluminum alloy comprising: Zn within a range of about 0.5 mass % to about 6.0 mass %, Si within a range of about 0.05 mass % to about 1.5 mass %, and Fe within a range of about 0.05 mass % to about 2.0 mass %, and balance Al and inevitable impurities.

7. The method of claim 6 wherein the aluminum alloy of the core material further comprises at least one of Mg within a range of about 0.05 mass % to about 0.5 mass %, Ti within a range of about 0.05 mass % to about 0.3 mass %, Zr within a range of about 0.05 mass % to about 0.3 mass %, Cr within a range of about 0.05 mass % to about 0.3 mass %, and V within a range of about 0.05 mass % to about 0.3 mass %.

8. The method of claim 6 wherein the Al/Si-based alloy of the filler material cladded to the at least one surface of the core material further comprises Zn within a range of about 0.3 mass % to about 5.5 mass %.

9. The method of claim 6 wherein the aluminum alloy of the sacrificial anode material further comprises at least one of Mn within a range of about 0.05 mass % to about 1.8 mass %, Mg within a range of about 0.5 mass % to about 3.0 mass %, Ti within a range of about 0.05 mass % to about 0.3 mass %, Zr mass % within a range of about 0.05 mass % to about 0.3 mass %, Cr will range of about 0.05 mass % to about 0.3 mass %, and V within a range of about 0.05 mass % to about 0.3 mass %.

10. The method of claim 6 wherein the composite material has a thickness of about 250 mm to about 800 mm prior to the hot clad rolling.

* * * * *